(12) United States Patent
Fraley et al.

(10) Patent No.: US 9,456,558 B2
(45) Date of Patent: Oct. 4, 2016

(54) STUMP CUTTER

(75) Inventors: J. Phillip Fraley, Winfield, AL (US); John W. Davis, III, Winfield, AL (US)

(73) Assignee: King Kutter, Inc., Winfield, AL (US)

( * ) Notice: Subject to any disclaimer, the term of this patent is extended or adjusted under 35 U.S.C. 154(b) by 145 days.

(21) Appl. No.: 12/916,176

(22) Filed: Oct. 29, 2010

(65) Prior Publication Data

US 2011/0100508 A1    May 5, 2011

Related U.S. Application Data

(60) Provisional application No. 61/256,215, filed on Oct. 29, 2009.

(51) Int. Cl.
*A01G 23/06* (2006.01)

(52) U.S. Cl.
CPC .................................. *A01G 23/067* (2013.01)

(58) Field of Classification Search
CPC .............................. A01G 23/06; A01G 23/067
USPC ...................... 144/24.12, 176, 218, 219, 334
See application file for complete search history.

(56) References Cited

U.S. PATENT DOCUMENTS

| | | | |
|---|---|---|---|
| 1,104,535 A * | 7/1914 | Moore et al. | 144/24.12 |
| 1,164,659 A * | 12/1915 | Moore et al. | 144/24.12 |
| 2,923,332 A * | 2/1960 | Osmun | 144/219 |
| 3,198,224 A | 8/1965 | Hiley | |
| 3,307,643 A | 3/1967 | Ferri | |
| 3,308,860 A | 3/1967 | De Shano | |
| 3,570,566 A | 3/1971 | McCreery | |
| 3,818,957 A * | 6/1974 | Schoonover | 144/34.1 |
| RE28,651 E | 12/1975 | Welborn | |
| 4,271,879 A | 6/1981 | Shivers, Jr. et al. | |
| 4,709,736 A | 12/1987 | Bellars | |
| 4,998,573 A | 3/1991 | York | |
| 5,048,579 A | 9/1991 | Lloyd | |
| 5,289,859 A | 3/1994 | Minton, Jr. et al. | |
| 5,355,918 A | 10/1994 | Lang | |
| 5,360,041 A * | 11/1994 | Stevens | 144/24.12 |
| 5,499,771 A | 3/1996 | Esposito et al. | |

(Continued)

FOREIGN PATENT DOCUMENTS

| DE | 42 18 069 | 2/1993 |
|---|---|---|
| DE | 101 27 125 | 12/2002 |

(Continued)

OTHER PUBLICATIONS

International Search Report and Written Opinion mailed Dec. 17, 2010 in corresponding International Application No. PCT/US2010/054817 filed Oct. 29, 2010.

(Continued)

*Primary Examiner* — Matthew G Katcoff
(74) *Attorney, Agent, or Firm* — Angela Holt; Bradley Arant Boult Cummings LLP (57) ABSTRACT

A stump cutter comprising a cutting head that rotates about a generally vertical axis is provided. The cutting head comprises a plurality of cutting blades that are angled with respect to a backing plate of the cutting head. At least two of the plurality of cutting blades are further angled radially with respect to a center of the cutting head, such that the centermost edges of the cutting blades extend further into a stump than the outermost edges of the cutting blades. The stump cutter is powered solely by the PTO of a tractor.

15 Claims, 8 Drawing Sheets

(56) References Cited

U.S. PATENT DOCUMENTS

| | | |
|---|---|---|
| 5,641,129 A | 6/1997 | Esposito et al. |
| 5,655,581 A | 8/1997 | Craft |
| 5,657,803 A | 8/1997 | Kappel et al. |
| 5,660,217 A | 8/1997 | Nissley |
| 5,718,271 A | 2/1998 | Engelhoven |
| 5,743,315 A | 4/1998 | Esposito et al. |
| 5,829,497 A | 11/1998 | Maroney |
| 5,887,634 A | 3/1999 | Theisen |
| 6,021,825 A | 2/2000 | Bowling |
| 6,047,749 A | 4/2000 | Lamb |
| 6,484,766 B1 | 11/2002 | Falatok et al. |
| 7,007,414 B2 | 3/2006 | Paumier |
| 7,011,124 B1 | 3/2006 | Morey |
| 7,150,300 B1 | 12/2006 | Peterson |
| 2006/0096664 A1 | 5/2006 | Dubbs et al. |
| 2007/0034294 A1 | 2/2007 | Chapman |
| 2007/0051427 A1 | 3/2007 | Wise |
| 2007/0125445 A1 | 6/2007 | Watts |

FOREIGN PATENT DOCUMENTS

| | | |
|---|---|---|
| GB | 2 299 007 | 9/1996 |
| WO | 2006/050222 | 5/2006 |

OTHER PUBLICATIONS

Stumpbuster Tree Stump Cutter Specification Sheet, Shaver Manufacturing Company, 1 page.
Stumpbuster Tree Stump Cutter Pamphlet, Shaver Manufacturing Company, 4 pages.
Stumpbuster Features, Shaver Manufacturing Company, found at http://www.shavermfg.com/SBSp.htm, printed on Jan. 1, 2008, 2 pages.
Stumper 3500, c2007, found at http://www.stumper3500.com/stumper3500/stump-grinder.html, printed on Mar. 25, 2008, 1 page.
Worksaver SmoothCut PTO & Hydraulic Powered Stump Grinders, Worksaver, Inc., c1996-1999, found at http://www.worksaver.com/product/stumpgrinder.html, printed on Mar. 25, 2008, 3 pages.

* cited by examiner

STUMP CUTTER

CROSS-REFERENCE TO RELATED APPLICATIONS

This application claims the benefit of U.S. Provisional Application No. 61/256,215 titled "Stump Cutter," filed on Oct. 29, 2009, the entire contents of which are herein incorporated by reference.

FIELD OF THE INVENTION

The present invention relates generally to the field of tractor-based, rotary-driven power equipment, and more particularly relates to a stump cutter.

BACKGROUND AND SUMMARY OF THE INVENTION

The stump cutter is attached to a tractor which provides both structural support and powers the stump cutter. A gearbox on the stump cutter connects to a power take-off (PTO) of the tractor. As is known by persons with skill in the relevant art, a PTO provides rotation to tractor implements. In this instance, the PTO provides rotation to the gearbox. The gearbox translates the rotation from the PTO to a cutting head that grinds the stumps. The cutting head extends beneath a structural frame which is lowered by the tractor over and onto a stump to grind the stump.

The cutting head comprises a plurality of serrated cutting blades disposed radially on a backing plate. The backing plate rotates around a generally vertical axis to cause the blades to grind the stump in a generally horizontal plane.

The plurality of cutting blades comprises at least two blades that are angled to form a central point for grinding the stump in a somewhat boring manner. In other words, the grinding is not uniformly in a horizontal plane, but rather the central portions of two cutting blades extend below the remaining cutting blades.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

The disclosure can be better understood with reference to the following drawings. The elements of the drawings are not necessarily to scale, emphasis instead being placed upon clearly illustrating the principles of the disclosure. Furthermore, like reference numerals designate corresponding parts throughout the several views.

FIG. 9b is a side plan view of the outer cutting blade of FIG. 8a.

DETAILED DESCRIPTION

Figure 1:
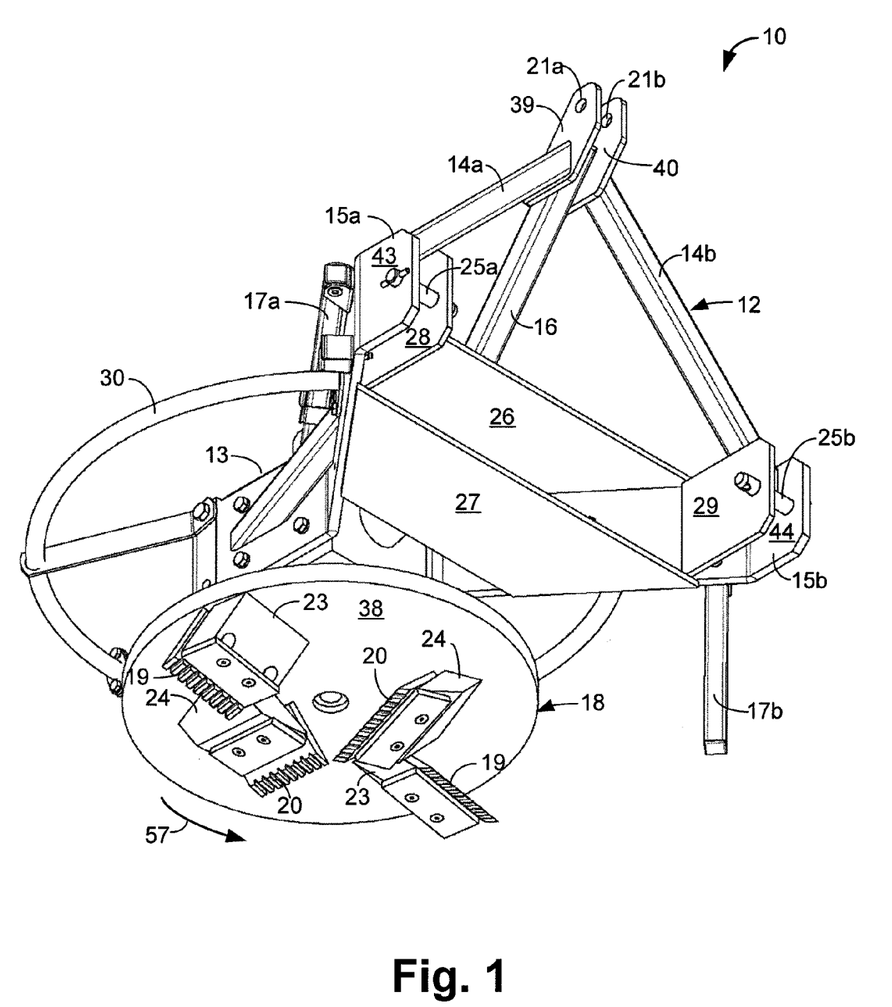
FIG. 1 is a bottom perspective view of an exemplary stump cutter in accordance with the present disclosure.

FIG. 1 is a bottom perspective view of a stump cutter 10 according to an embodiment of the present disclosure. The stump cutter 10 comprises a rotating cutting head 18 comprising a plurality of outer cutting blades 19 and inner cutting blades 20 mounted to a backing disc 38. Each outer cutting blade 19 is releasably attached to an outer blade mount block 23 and each inner cutting blade 20 is releasably attached to an inner blade mount block 24, as further discussed herein. The blade mount blocks 23 and 24 are rigidly affixed to the backing disc, by welding in the illustrated embodiment.

The cutting head 18 extends downwardly from a gearbox 13, from which the cutting head 18 receives rotation. The gearbox 13 receives rotation from a PTO (not shown) of a tractor (not shown). The cutting head rotates in the direction indicated by directional arrow 57. The rotation of the cutting head 18 is in a generally vertical plane and the rotation of the PTO is in a generally horizontal plane. The gearbox 13 is thus a right angle gearbox that translates horizontal rotation from the PTO to vertical rotation for the cutting head 18.

A guard 30 surrounds the gearbox and extends beyond the outer edge of the cutting head 18 to protect a user (not shown) from contact with the cutting head 18.

The stump cutter 10 may be installed on the tractor (not shown) by a three point hitch (not shown) that is known in the art. The stump cutter 10 comprises a lift frame 12 that couples with the three point hitch. The lift frame 12 comprises a right upper lift arm plate 39 and a left upper lift arm plate 40. The right upper lift arm plate 39 is parallel to and spaced apart from the left upper lift arm plate 40. The right upper lift arm plate 39 comprises an opening 21a and the left upper lift arm plate 40 comprises a substantially similar opening 21b that is aligned with the opening 21a. The openings 21a and 21b receive a lift pin (not shown) that extends between the right upper lift arm plate 39 and the left upper lift arm plate 40. The lift pin couples with the top (not shown) of the three point hitch.

The lift frame 12 further comprises a right lift arm 14a which extends downwardly and at an angle from the right upper lift arm plate 39. The lift frame further comprises a left lift arm 14b which extends downwardly and at an angle from the left upper lift arm plate 40. The right lift arm 14a and the right upper lift arm plate 39 are generally mirror images of the left lift arm 14b and the left upper lift arm plate 40.

The lift frame 12 further comprises a right frame support 15a and a left frame support 15b. The right frame support 15a extends from a right side of the gearbox 13 forwardly at an angle to the right lift arm 14a. The left frame support 15b extends from a left side of the gearbox 13 forwardly at an angle to the left lift arm 14b. An upper horizontal frame support 26 extends between and is rigidly affixed to the right frame support 15a and the left frame support 15b. A lower horizontal frame support 27 extends between and is rigidly affixed to the right frame support 15a and the left frame support 15b. The upper horizontal frame support 26 and the lower horizontal frame support 27 each comprise generally flat plates generally trapezoidal in shape and are generally parallel to and spaced apart from one another.

A right lift arm plate 28 extends between and is rigidly affixed to the upper horizontal frame support 26 and the lower horizontal frame support 27. The right frame support 15a terminates at a right forward portion 43 that is spaced apart from and generally parallel to the right lift arm plate 28. A lift pin 25a is received by openings (not shown) in the right forward portion 43 and the right lift arm plate 28.

A left lift arm plate 29 extends between and is rigidly affixed to the upper horizontal frame support 26 and the lower horizontal frame support 27. The left frame support 15b terminates at a left forward portion 44 that is spaced apart from and generally parallel to the left lift arm plate 29. A lift pin 25b is received by openings (not shown) in the left forward portion 44 and the right lift arm plate 29. The lift pins 25a and 25b couple with lower connections (not shown) of the three point hitch (not shown) for coupling the stump cutter 10 to the tractor (not shown).

The frame 12 further comprises a right support stand 17a and a left support stand 17b. The right support stand 17a is rotatably coupled to the right frame support 15a. The left support stand 17b is rotatably coupled to the left frame support 15b. The support stands 17a and 17b are extendable downwardly (i.e., the support stands 17a and 17b may be rotated to a "deployed position") to contact the ground (not shown) and support the stump cutter 10 when the stump cutter 10 is not coupled with the tractor (not shown). The support stands 17a and 17b are rotatable to a stowed position generally parallel with the longitude of the frame supports 15a and 15b when not in use. Note that in FIG. 1, the support stand 17b is illustrated in a deployed position and the support stand 17a is illustrated in a stowed position.

Figure 2:
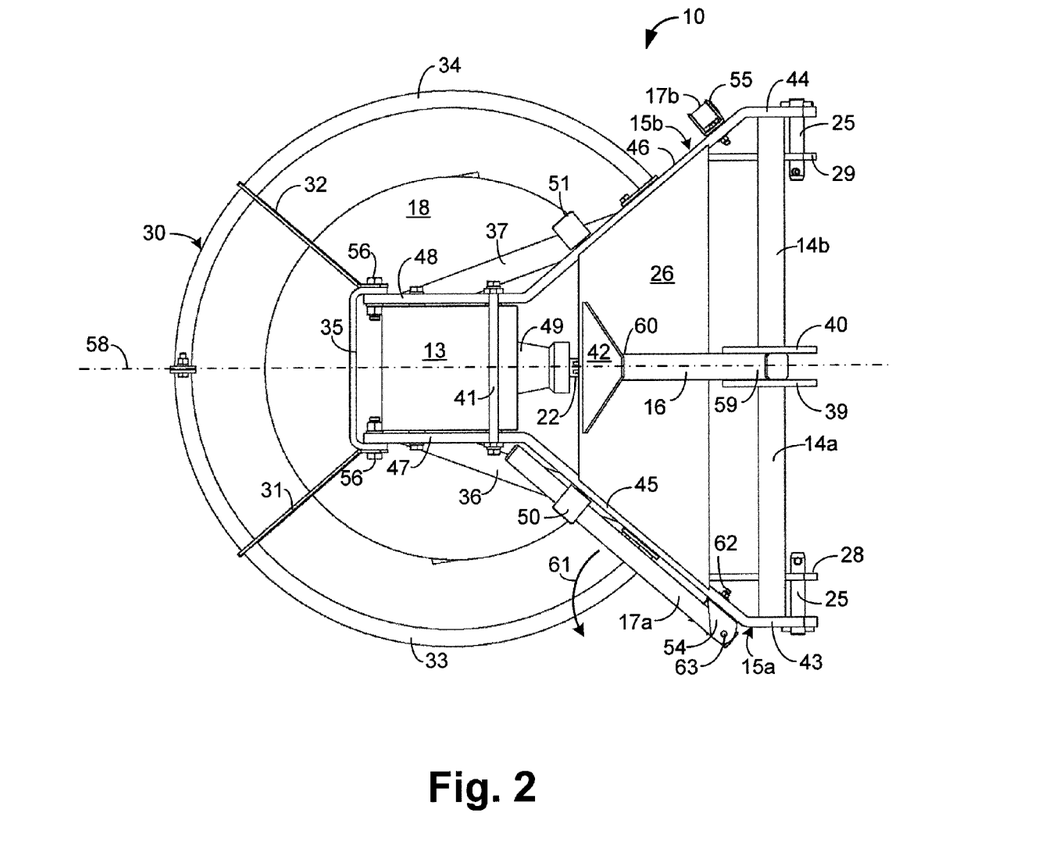
FIG. 2 is a top plan view of the stump cutter of FIG. 1.

FIG. 2 is a top plan view of the stump cutter 10 of FIG. 1. The stump cutter 10 is generally symmetrical about a centerline 58 in the illustrated embodiment. The gearbox 13 is centrally disposed above the cutting head 18. A right rearward portion 47 of the right frame support 15a bounds a right side of the gearbox 13 and a left rearward portion 48 of the left frame support 15b bounds a left side of the gearbox 13. A rear frame support 35 is generally C-shaped and extends between the right rearward portion 47 of the right frame support 15a and the left rearward portion 48 of the left frame support 15b. The rear frame support 35 is releasably affixed to the right rearward portion 47 and the left rearward portion 48 via a plurality of fasteners 56.

A handle 41 extends between the right frame support 15a and the left frame support 15b above the gearbox 15. A forward shaft cover 49 extends frontwardly from the gearbox 13 and covers a rotating shaft 22 that translates rotation from the tractor (not shown) to the gearbox 13.

The right frame support 15a comprises a right upper spring clip 50 which releasably retains the right support stand 17a when the right support stand 17a is in its stowed position. The right support stand 17a is rotatably affixed to the right frame support 15a via a right pivot plate 54.

The right pivot plate 54 is rotatably affixed to the right frame support 15a via a fastener 62. The right pivot plate 54 is rotatably affixed to the right support stand 17a at rotation point 63. The right support stand 17a is rotatable outwardly in the direction indicated by directional arrow 61 by rotation of the right support stand 17a around rotation point 63 (i.e., rotation with respect to the pivot plate 54). The right support stand 17a is rotatably downwardly (i.e., toward the ground (not shown)) by rotation of the right support stand 17a around the fastener 62 (i.e., rotation with respect to the right frame support 15a).

The left support stand 17b comprises a left upper spring clip 51 which releasably retains the left support stand 17b when the left support stand 17b is in its stowed position. The left support stand 17b is rotatably affixed to the left support stand 17b via a left pivot plate 55. The left pivot plate 55 is substantially similar to the right pivot plate 54, and the rotation of the left support stand 17b is substantially similar to that of the right support stand 17a.

The guard 30 extends semi-circularly between the right frame support 15a and the left frame support 15b and extends beyond an outside edge of the cutting head 18. The guard is fabricated from hollow round tubing in the illustrated embodiment. The guard comprises a right segment 33 and a left segment 34. The right segment 33 is affixed at one end to the right frame support 15a and is affixed on its other end to the left segment 34. The left segment is affixed at one end to the left frame support 15b and on its other end to the right segment 33.

A right guard support 31 extends from the rear frame support 35 and supports the right segment 33. A left guard support 32 extends from the rear frame support 35 and supports the left segment 34.

The right frame support 15a is a generally thin plate that is bent into three segments: a right forward portion 43, a right central portion 45, and a right rearward portion 47. A right gearbox support bar 36 extends between the right central portion 45 and the right rearward portion 47 to rigidify the right frame support 15a.

The left frame support 15b is a generally thin plate that is bent into three segments: a left forward portion 44, a left central portion 46, and a left rearward portion 48. A left gearbox support bar 37 extends between the left central portion 46 and the left rearward portion 48 to rigidify the left frame support 15b.

A central support 16 extends between the upper horizontal frame support 26 and the lift frame 12. The central support 16 comprises hollow tubing with a generally rectangular cross section in the illustrated embodiment. A forward end 59 of the central support 16 is rigidly affixed to and between the right upper lift arm plate 39 and the left upper lift arm plate 40. A rearward end 60 of the central support 16 is rigidly affixed to the horizontal frame support 26.

A central support brace 42 is rigidly affixed to the rearward end 60 of the central support 16. The central support brace 42 is a generally trapezoidal-shaped thin plate extending upwardly from the horizontal frame support 26. In one embodiment, the central support brace 42 is welded to the horizontal frame support 26 and to the central support 16.

Figure 3:
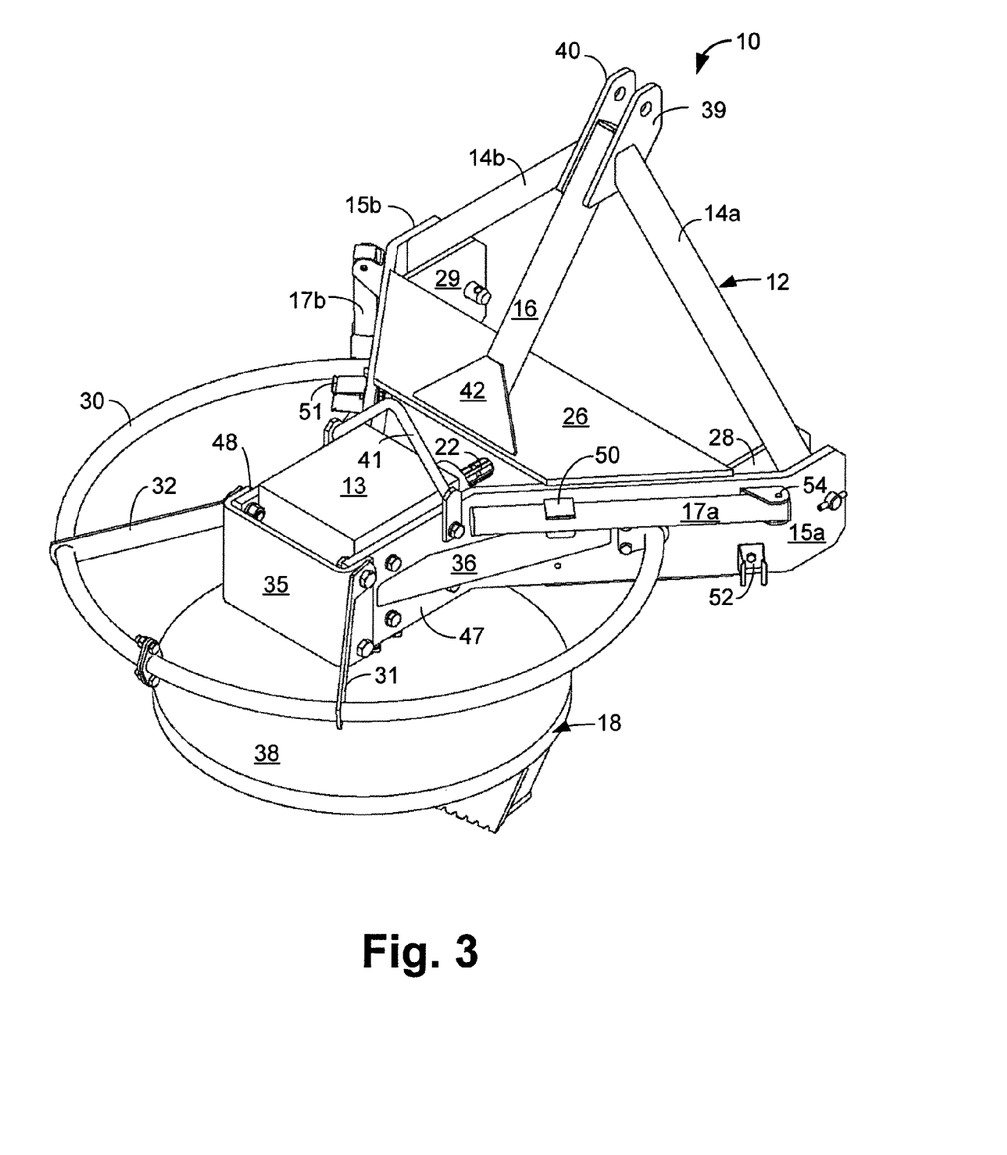
FIG. 3 is a rear perspective view of the stump cutter of FIG. 1.

FIG. 3 is a rear perspective view of the stump cutter of FIG. 1. In the illustrated embodiment, the handle 41 is shaped similarly to an inverted "V" and extends above the gearbox 13 and between the right rearward portion 47 of the right frame support 15a and the left rearward portion 48 of the left frame support 15b. The rotating shaft 22 extends forwardly from the gearbox 13 and receives rotation from the PTO (not shown) of the tractor (not shown).

Figure 4:
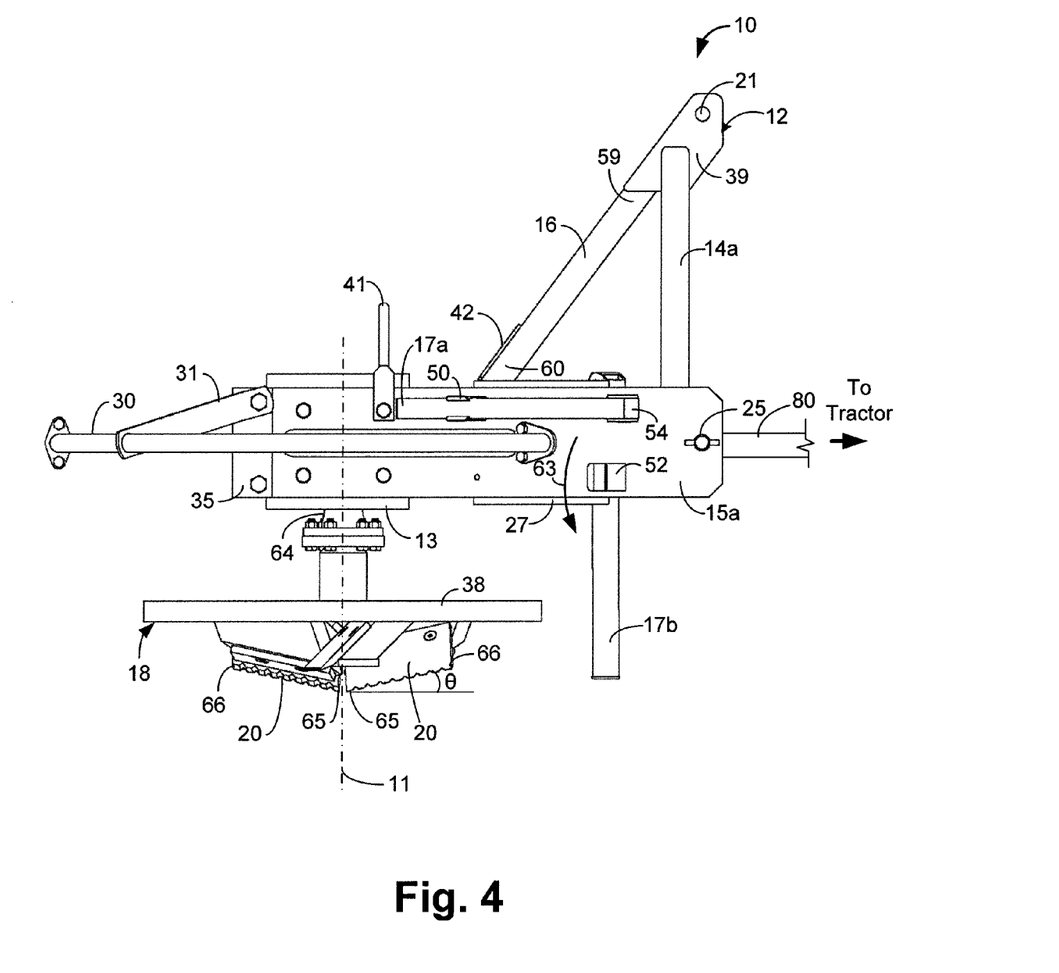
FIG. 4 is a side plan view of the stump cutter of FIG. 1.

FIG. 4 is a side plan view of the stump cutter of FIG. 1. The right support stand 17a is releasably retained by the right upper spring clip 50 when the right support stand 17a is in its stowed position, as illustrated. The right support stand 17a rotates outwardly (i.e. away from the right frame support 15a, as discussed above) and downwardly in the direction indicated by directional arrow 63 to deploy the right support stand 17b. The right support stand 17a may be releasably retained in a right lower spring clip 52 when the right support stand 17a is in its deployed position. The rotation and releasable retention of the left support stand 17b is substantially similar to that of the right support stand 17a.

A lower gearbox shaft cover 64 extends downwardly from the gearbox 13 and surrounds a vertical shaft (not shown) that translates generally horizontal rotation received from the PTO 80 of the tractor (not shown) into generally vertical rotation to rotate the cutting head 18. The cutting head 18 rotates around a central axis 11 that is generally vertical and is generally perpendicular to the cutting head 18.

As persons with skill in the relevant art would know, implements such as the stump cutter 10 that are attached to a tractor via a three point hitch may be tilted forward, backwards, and side-to-side by operation of the tractor's controls. Therefore the description herein of the gearbox translation from "generally horizontal" rotation received from the PTO to "generally vertical" rotation of the cutting head 18 is understood in this context. In other words, the cutting head 18 will not always be rotating in a true horizontal plane, as it is subject to adjustment by the tractor operator.

The inner cutting blades 20 are disposed on the backing disc 18 near the center (not shown) of the backing disc. The cutting blades 20 are angled with respect to the backing disc such that their inner side edges 65 extend below their outer side edges 66. In other words, the cutting blades 20 are disposed at an angle "θ" with respect to the backing disc. This arrangement causes the cutting blades 20 to operate in a boring fashion (i.e., to bore into a stump from the center of the cutting head 18) when the cutting head 18 rotates. In the illustrated embodiment, the angle θ is substantially 12 degrees, but other angles may be employed in other embodiments.

Figure 5:
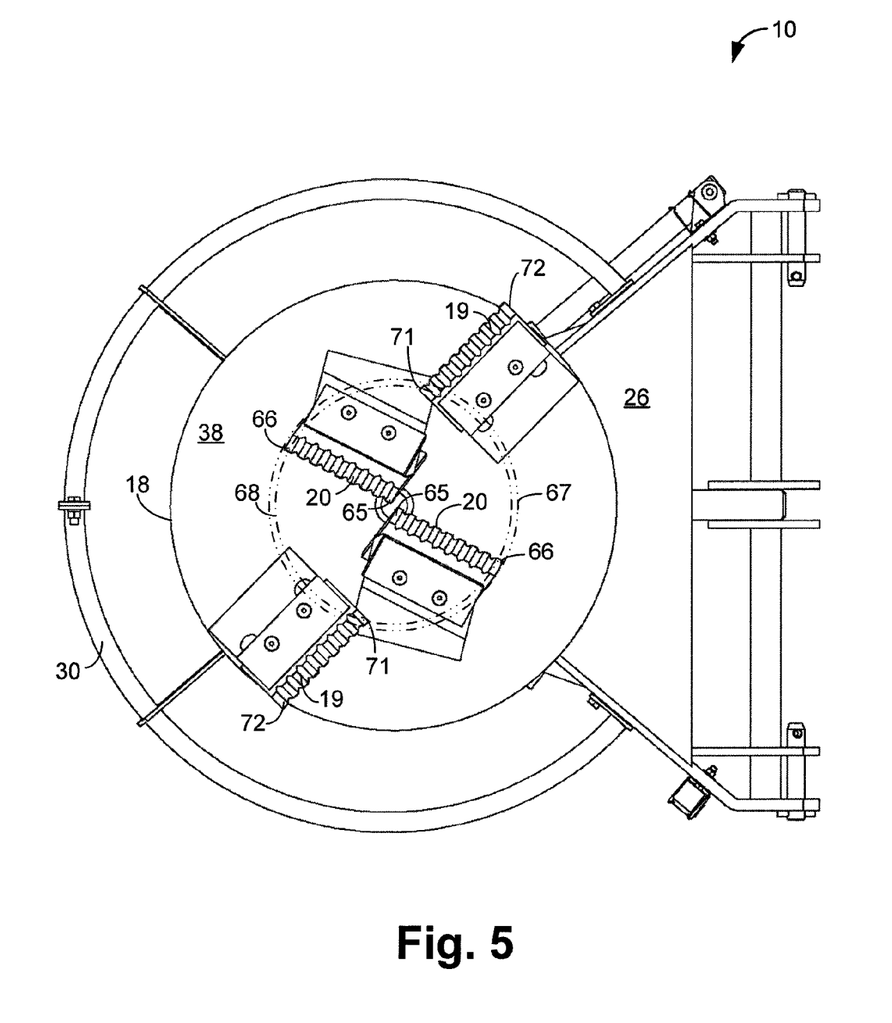
FIG. 5 is a bottom plan view of the stump cutter of FIG. 1.

FIG. 5 is a bottom view of the stump cutter 10 of FIG. 1. The inner cutting blades 20 are disposed radially with respect to the backing plate such that the inner cutting blades 20 cut in the same direction when the cutting head 18 is rotating about a central axis. The inner side edges 65 of the inner cutting blades 20 are closely spaced near the center of the backing plate 18.

The outer side edges 66 of the inner cutting blades define an inner blade cutting diameter 67 (i.e. a diameter of the cutting path of the inner blades 20). Inner side edges 71 of the outer cutting blades 19 define an outer blade cutting diameter 68 (i.e., a diameter of the cutting path of the outer cutting blades 19). Note that the blades 19 and 20 are positioned such that the inner blade cutting diameter 67 is larger than the outer blade cutting diameter 68. Outer side edges 72 of the outer cutting blades 19 extend at least to an outside edge 73 of the backing plate 38, and in the illustrated embodiment extend beyond the outside edge 73. In this embodiment therefore, the blades 19 and 20 are positioned such that they cut in a path generally equal to the diameter of the cutting head 18.

Figure 6:
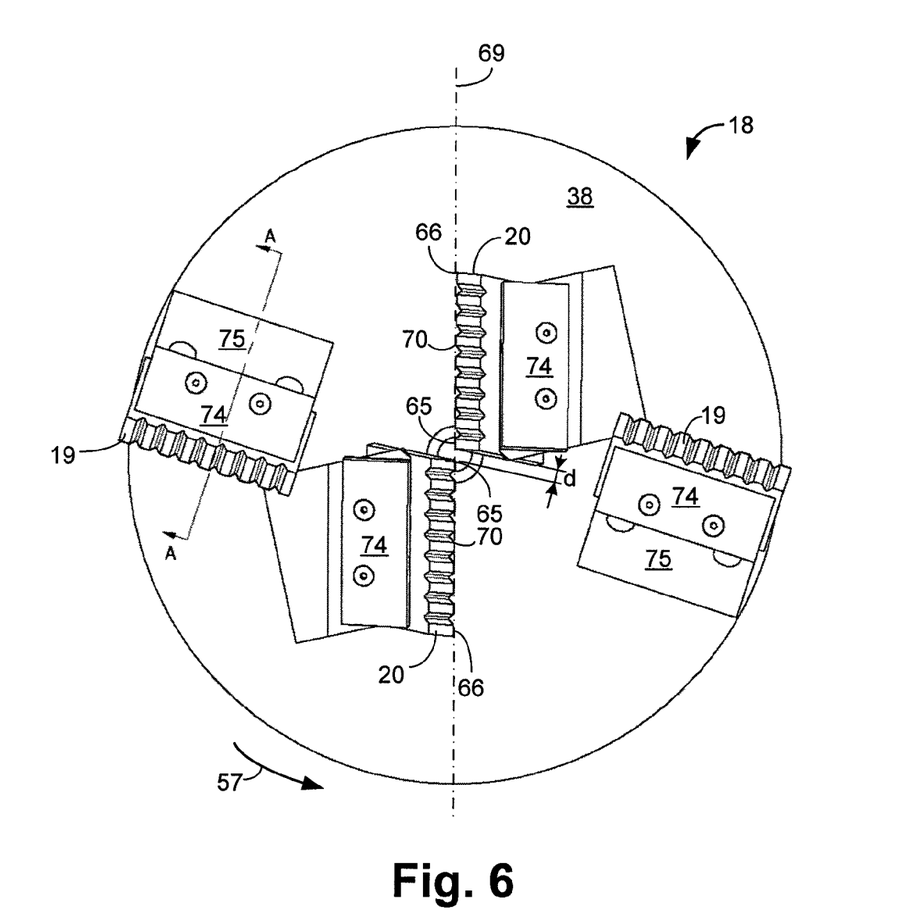
FIG. 6 is a bottom plan view of a cutting head according to an exemplary embodiment of the present disclosure.

FIG. 6 is a bottom plan view of the cutting head 18 according to an embodiment of the present disclosure. The inner cutting blades 20 comprise leading edges 70 that are generally aligned along a centerline 69 of the cutting head 18. The inner side edges 65 of the inner cutting blades 20 are spaced apart from one another by a distance "d," which is 0.5 inches in the illustrated embodiment.

The backing plate is a flat circular plate, and in the illustrated embodiment is thirty (30) inches in diameter and formed from steel. The outer cutting blades 19 and inner cutting blades 20 are eight (8) inches wide by five (5) inches deep in one embodiment, and are formed from one-half inch thick steel.

Figure 7:
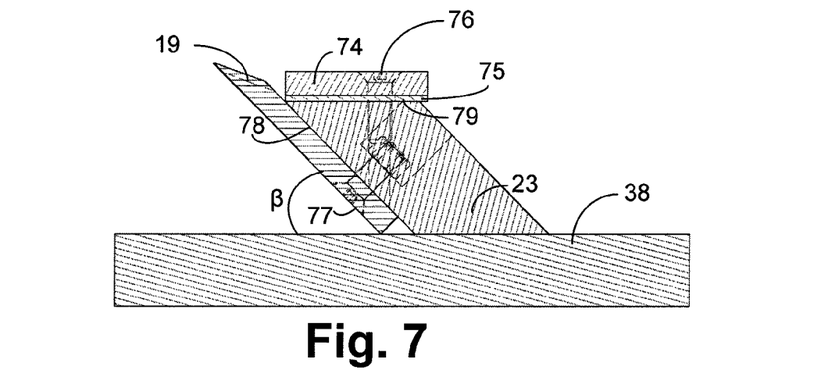
FIG. 7 is a cross-sectional view of the outer cutting blade of FIG. 6, taken along section lines A-A of FIG. 6.

FIG. 7 is a cross-sectional drawing of the cutting blade 19 of FIG. 6, taken along section lines A-A of FIG. 6. The outer blade mount block 23 is rigidly affixed to the backing plate 38, by welding in one embodiment. The outer blade mount block 23 and the backing plate 38 are formed from steel or other suitably strong and rigid material. The outer cutting blade 19 is releasably affixed to the outer blade mount block 23 via a plurality of fasteners 77 (one of which fasteners 77 is shown in FIG. 7).

The outer blade mount block 23 is shaped as a parallelogram in the illustrated embodiment, with the outer cutting blade 19 affixed to the leading edge 78 of the outer blade mount block 23. The cutting blade 19 and the leading edge 78 are angled at an angle "β" with respect to the backing plate 38. β is 45 degrees in the illustrated embodiments, and maybe differently angled in other embodiments.

A heel pad 74 is affixed to the top surface 79 of the outer blade mount block 23 via a plurality of fasteners 76. The heel pad 74 may be directly affixed to the top surface 79, or may be separated by one or more spacer shims 75, as illustrated. The spacer shims 75 may be used to adjust the depth of the cut of the outer cutting blade 19. In other words, adding spacer shims 75 causes the cutting blade 19 to cut shallower than without the spacer shims 75. The heel pad 74 and the spacer shims 75 may be formed from steel or other suitably strong and rigid materials.

The inner blade mount block 24 (FIG. 1) is similar in configuration to the outer blade mount block 23, except that the inner blade mount block 24 is shaped such that the inner cutting blade 20 (FIG. 6) will be angled with respect to the backing plate 38 as discussed herein, i.e., with the distance between the backing plate 38 and the inner side edge 65 (FIG. 6) of the inner cutting blade 20 being larger than the distance between the backing plate 38 and the outer side edge 66 (FIG. 6) of the inner cutting blade 20.

Figure 8:
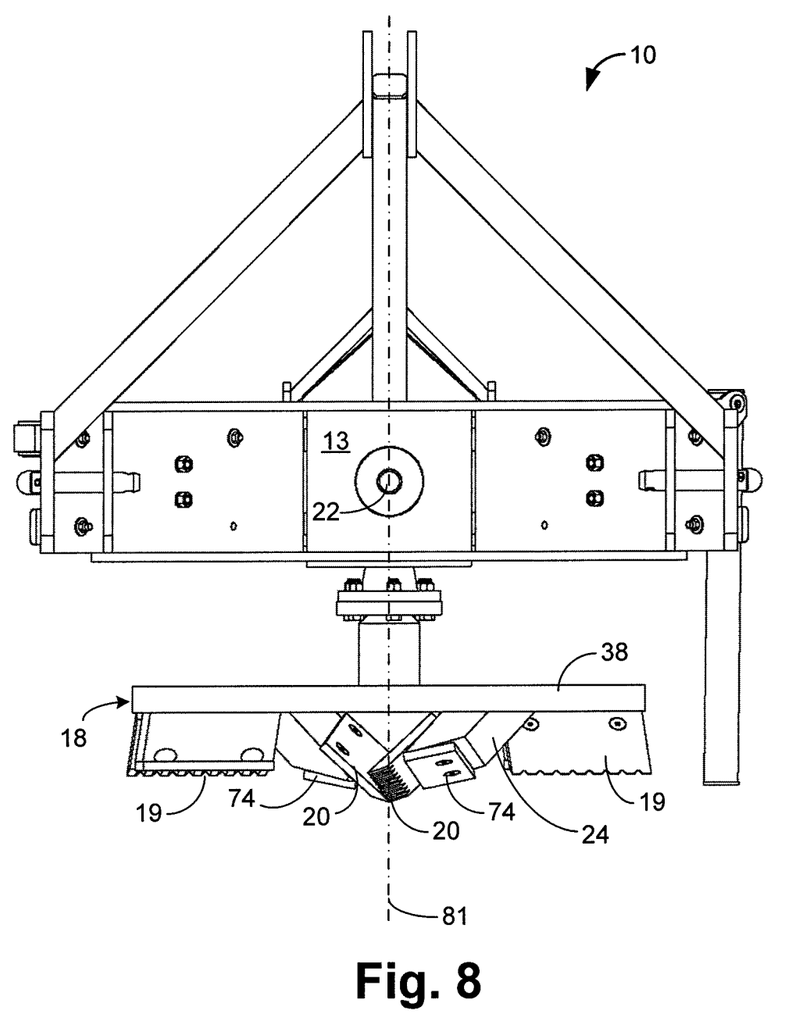
FIG. 8 is a front plan view of the stump cutter of FIG. 1.

FIG. 8 is a front view of the stump cutter of FIG. 1. The rotating shaft 22 extends forwardly from the gearbox 13. The centerline 81 of the cutting head 18 is generally aligned with the center of the rotating shaft 22.

Figure 9A:
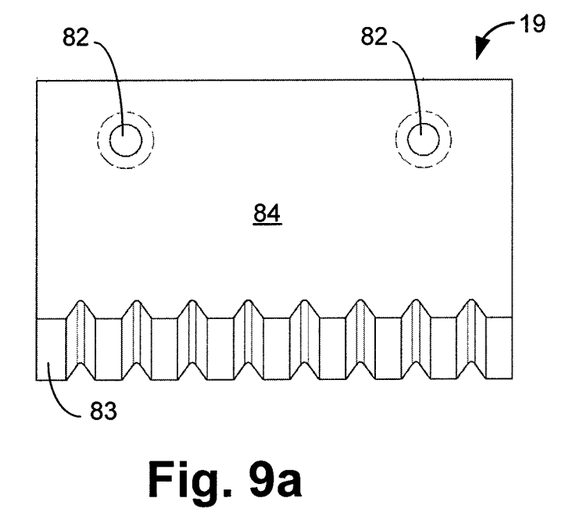
FIG. 9a is a rear plan view of an outer cutting blade according to an embodiment of the present disclosure.

FIG. 9a is a rear plan view of the outer cutting blade 19, which is substantially similar to the inner cutting blade 20. The blade 19 is generally rectangular with a serrated cutting edge 83. The blade 19 is formed from steel in the illustrated embodiment, and comprises a plurality of openings 82 for receiving fasteners 77 (FIG. 7) that releasably affix the blade 19 to the outer blade mount block 23 (FIG. 7). The openings 82 are standard countersunk holes in the illustrated embodiment.

Figure 9B:
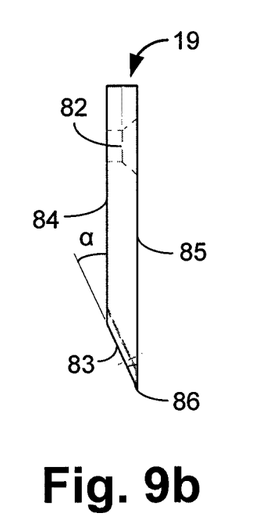

FIG. 9b is a side plan view of the outer cutting blade 19 of FIG. 9a. The cutting edge 83 extends at an angle between a generally flat rear side 84 and a generally flat front side 85, and terminates at a pointed tip 96. The cutting edge 83 is angled with respect to the front and rear sides 85 and 84 at an angle of "α," which is approximately 25 degrees in the illustrated embodiment.

What is claimed is:
1. A stump cutter, comprising:
a gearbox comprising a substantially horizontal shaft and a substantially vertical shaft, the horizontal shaft receiving rotation from a power take-off (PTO) of a tractor and translating the rotation of the vertical shaft; and
a cutting head rigidly coupled to the vertical shaft such that the cutting head rotates in a horizontal plane as the vertical shaft rotates, the cutting head comprising a lower surface generally perpendicular to the vertical shaft, the cutting head having a pair of inner cutting blades and a pair of outer cutting blades rigidly affixed to a bottom side of the cutting head, the pair of inner cutting blades disposed inwardly of the pair of outer cutting blades, the pair of outer cutting blades disposed toward an outer periphery of the cutting head, the pair of inner cutting blades and the pair of outer cutting blades disposed entirely beneath the cutting head, the pair of inner cutting blades disposed angularly with respect to the lower surface of the cutting head, the inner cutting blades and the outer cutting blades each comprising cutting edges, the cutting edges comprising inner side edges and outer side edges, the inner side edges of the pair of inner cutting blades extending below the outer side edges at an angle, the inner side edges of the pair of inner cutting blades combining to form a central point configured to bore into the stump when the cutter is in operation, the cutting edges of the pair of outer cutting blades aligned substantially parallel to the lower surface of the cutting head.

2. The stump cutter of claim 1, wherein the gearbox is powered solely by the PTO of the tractor.

3. The stump cutter of claim 1, wherein the inner side edges of the cutting edges of the outer pair of blades lead the outer side edges of the cutting edges of the outer pair of blades when the cutting head rotates in operation of the cutter.

4. The stump cutter of claim 1 further comprising a substantially circular guard that surrounds the gearbox and has a larger diameter than the cutting head, to protect a user from contact with the cutting head.

5. A stump cutter, comprising:
a cutting head generally perpendicular to and interfacing with a vertical shaft for rotating the cutting head;
a first pair of cutting blades coupled toward an outer periphery of the cutting head on an underside of the cutting head, the cutting blades of the first pair of cutting blades disposed substantially 180 degrees apart around the outer periphery from one another, the first pair of cutting blades comprising cutting edges aligned substantially parallel to the underside of the cutting head;
a second pair of cutting blades coupled toward the center of the cutting head on an underside of the cutting head, wherein each of the second pair of cutting blades comprises a serrated leading edge, and the serrated leading edges of the second pair of cutting blades are substantially aligned along a centerline of the cutting head, where centermost edges of the second pair of cutting blades form a central point configured to bore into the stump when the cutter is in operation.

6. The stump cutter of claim 5, further comprising a horizontal shaft coupled to a power take-off (PTO) of a tractor.

7. The stump cutter of claim 6, wherein the vertical shaft and the horizontal shaft are received by a gearbox and the gearbox translates rotation of the horizontal shaft to rotation of the vertical shaft.

8. A stump cutter, comprising:
a cutting head rigidly coupled to a vertical shaft for rotating the cutting head, the cutting head comprising a lower surface generally perpendicular to the vertical shaft;
a first cutting blade rigidly affixed to the lower surface, the first cutting blade angularly disposed relative to the lower surface and angularly disposed with respect to a center of the cutting head such that an inner edge of the first cutting blade is lower than an outer edge of the first cutting blade with respect to the lower surface of the cutting head;
a second cutting blade rigidly affixed to the lower surface, the second cutting blade angularly disposed relative to the lower surface and angularly disposed with respect to a center of the cutting head such that an inner edge of the second cutting blade is lower than an outer edge of the second cutting blade with respect to the lower surface of the cutting head, where centermost edges of the first and second cutting blades are positioned near the center of the cutting head, such that the centermost edges of the first and second cutting blades form a central point configured to bore into the stump when the cutter is in operation;
a third and a fourth cutting blade rigidly affixed to the lower surface, the third and fourth cutting blades disposed outwardly of the first and second cutting blades and disposed near an outer periphery of the cutting head, the third and fourth cutting blades aligned substantially parallel to the lower surface of the cutting head.

9. The stump cutter of claim 8, further comprising a horizontal shaft coupled to a power take-off (PTO) of a tractor.

10. The stump cutter of claim 9, wherein the vertical shaft and the horizontal shaft are received by a gearbox and the gearbox translates rotation of the horizontal shaft to rotation of the vertical shaft.

11. The stump cutter of claim 1, wherein leading edges of the pair of inner cutting blades are substantially aligned along a centerline of the cutting head.

12. The stump cutter of claim 1, each cutting blade removably mounted to a mount block, the mount block rigidly affixed to the bottom side of the cutting head.

13. The stump cutter of claim 1, further comprising a frame rigidly affixed to the gearbox;
a right support stand rotatably coupled to the frame;
a left support stand rotatably coupled to the frame, wherein the right support stand and the left support stand rotate downwardly to contact a surface and support the stump cutter when the stump cutter is not connected to the tractor, and wherein the right support stand and the left support stand rotate upwardly to a stowed position when the stump cutter is in use.

14. The stump cutter of claim 5, wherein the first pair of cutting blades are coupled to the cutting head such that innermost edges of the cutting edges lead outermost edges of the cutting edges when the cutting head rotates in operation of the cutter.

15. The stump cutter of claim 8, wherein the third and fourth cutting blades are affixed to the cutting head such that innermost edges of the third and fourth cutting blades lead outermost edges of the third and fourth cutting blades when the cutting head rotates in operation of the cutter.

* * * * *